G. D. LUCE.
Press for Baling Fibrous Material.

No. 214,673. Patented April 22, 1879.

WITNESSES.
J. C. Hubbell
James I. Riddell

INVENTOR.
Geo. D. Luce
BY H. N. Jenkins
ATTORNEY.

UNITED STATES PATENT OFFICE.

GEORGE D. LUCE, OF NEW ORLEANS, LOUISIANA, ASSIGNOR OF ONE-HALF HIS RIGHT TO O. J. FLAGG, OF SAME PLACE.

IMPROVEMENT IN PRESSES FOR BALING FIBROUS MATERIAL.

Specification forming part of Letters Patent No. 214,673, dated April 22, 1879; application filed June 17, 1878.

*To all whom it may concern:*

Be it known that I, GEORGE D. LUCE, a resident of the city of New Orleans, parish of Orleans, and State of Louisiana, have invented a certain new and useful Improvement in Presses for Baling Fibrous Material; and I do hereby declare the following to be a full, clear, and correct description of the same, reference being had to the annexed drawings, making a part of this specification.

This invention relates to presses for baling fibrous material; and consists in the construction, combination, and arrangement hereinafter set forth.

Figure 1:
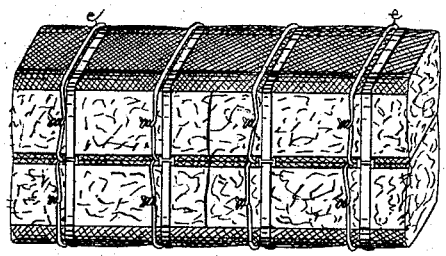
Figure 2:
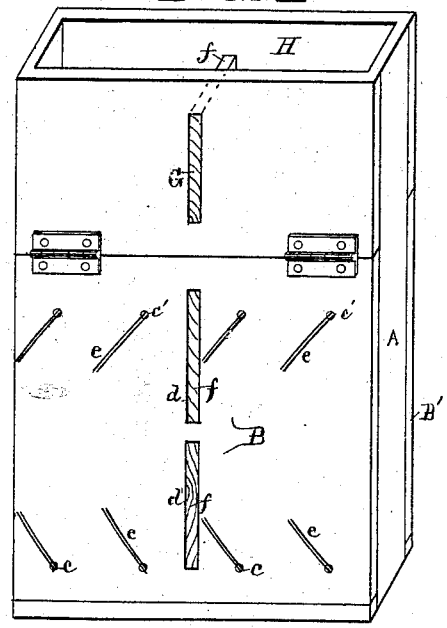
Figure 3:
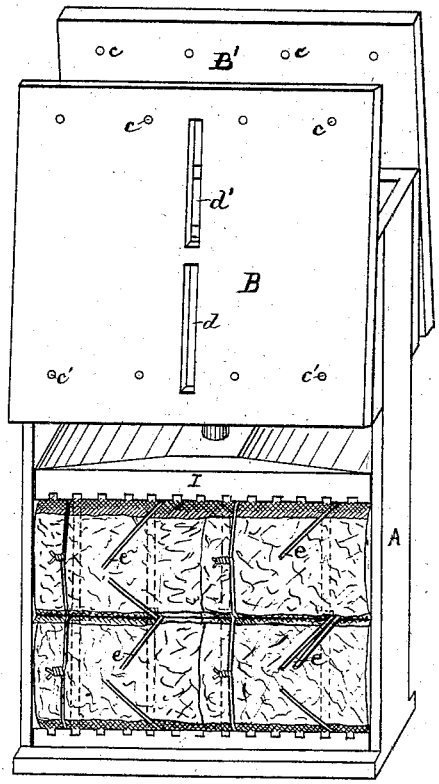

In order that my invention may be clearly understood, attention is called to the accompanying drawings, whereon Figure 1 represents a perspective view of four small bales combined in one package, as in the nature of my invention. Figs. 2 and 3 are perspective views of the box in which the baling is effected. In the latter figure the doors are raised in order to fully illustrate the manner in which the bales are secured.

A is the baling-box, the front and rear of which are furnished with hinged doors B B'. These are provided near their upper and lower edges with horizontal rows of perforations $c\ c'$, and through their centers with vertical rectangular slots, as shown at $d\ d'$. The perforations $c\ c'$ are for the passage of the wires or bands $e$, by which the bales are secured, and the rectangular slots for the reception of the ends of pieces of board $f$, which are employed for dividing the box into two vertical sections. Rectangular slots are also cut in the upper portion of the box, as at $g$, for a similar purpose.

In the baling process the doors are first closed, and secured in the ordinary manner, when bands or wires are passed through and made to project an even distance beyond their lower line of perforations, $c$. Upon that portion of the said bands which is contained within the box, and which is supported in a horizontal position by the bottom or lower platen thereof, is next laid a piece of bagging, about the full length but somewhat wider than the box. The board partitions $f$ are then slipped into their respective slots, and the moss, or other material of which the bales are to be formed, fed in through the open top H, on either or both sides of the same.

When a sufficient quantity of material has been fed in to form the lower bales, it is tramped or pressed down below the line of the perforations $e'$. Strips of bagging about the length and width of each compartment are next laid thereupon, after which a series of two bands each are passed through the aforesaid perforations $c'$, and pieces of bagging corresponding in size to those just mentioned laid thereupon. The material for the upper bales is then fed in and packed. This is next covered with a piece of bagging of about the same size as that first mentioned as being laid upon the lower bands, and above this is placed another set of bands. The partitions are then removed and the whole mass reduced to its smallest compass by the application of power to the upper platen or follower, I. The doors are then opened and the bands secured on each side of their respective bales. The package is finally completed by passing bands around the same and securing their ends in the usual manner.

Having described my invention, what I claim as new, and desire to secure by Letters Patent, is—

1. In combination with a baling-box, the hinged doors B, having perforations $c\ c'$, arranged in series, substantially as and for the purposes set forth.

2. In combination with a baling-box having hinged doors B, provided with perforations $c\ c'$, arranged in transverse series, as shown, the wires $e$, for fastening the several sub-bales of a composite bale, substantially as set forth.

In testimony whereof I have hereunto signed my name.

GEO. D. LUCE.

In presence of—
J. C. HUBBELL,
JAMES C. KIDDELL.